United States Patent [19]
Ueno et al.

[11] 4,346,950
[45] Aug. 31, 1982

[54] DOOR CONSTRUCTION FOR ELECTRONIC EQUIPMENT

[75] Inventors: Hitoshi Ueno; Shirokazu Yazaki; Yukitada Ayukawa, all of Tokorozawa, Japan

[73] Assignee: Pioneer Electronic Corporation, Tokyo, Japan

[21] Appl. No.: 170,229

[22] Filed: Jul. 18, 1980

[30] Foreign Application Priority Data

Jul. 20, 1979 [JP] Japan ................................ 54-92238

[51] Int. Cl.³ .................... A47B 88/00; A47F 3/00; E05D 15/58
[52] U.S. Cl. .............................. 312/138 R; 312/307; 312/322; 312/325; 16/361
[58] Field of Search ............... 312/138 R, 138 A, 307, 312/322, 325, 8, 9, 10, 14; 16/179; 206/387

[56] References Cited

U.S. PATENT DOCUMENTS

| 866,158 | 9/1907 | McIntyre | 312/322 |
| 1,091,670 | 3/1914 | Kump | 312/138 R |
| 1,345,692 | 7/1920 | Providenti | 312/8 |
| 1,868,322 | 7/1932 | Herrenbruck | 312/138 R |
| 3,075,819 | 1/1963 | Liegeon et al. | 312/325 |
| 3,085,843 | 4/1963 | Mallina | 312/8 |
| 3,539,239 | 11/1970 | Mallonn | 312/307 |
| 3,907,390 | 9/1975 | Moriarty | 312/9 |
| 4,118,616 | 10/1978 | Wittkamp et al. | 206/387 |

Primary Examiner—Victor N. Sakran
Attorney, Agent, or Firm—Sughrue, Mion, Zinn, Macpeak & Seas

[57] ABSTRACT

A door construction for covering control knobs or the like upon the front panel of the electronic equipment. Hinge members rigidly coupled to the door member have rotatably mounted thereon guide rollers which are disposed into corresponding guide grooves. Each guide groove has a linear guide portion and an enlarged circular guide groove at the front end thereof. Each of the guide rollers has a substantially oblong portion and a coaxial cylindrical portion wherein the door is movable only horizontally when the oblong portions are engaged with the linear grooves and the door is only rotatable when the circular portions are engaged with the enlarged circular grooves.

9 Claims, 12 Drawing Figures

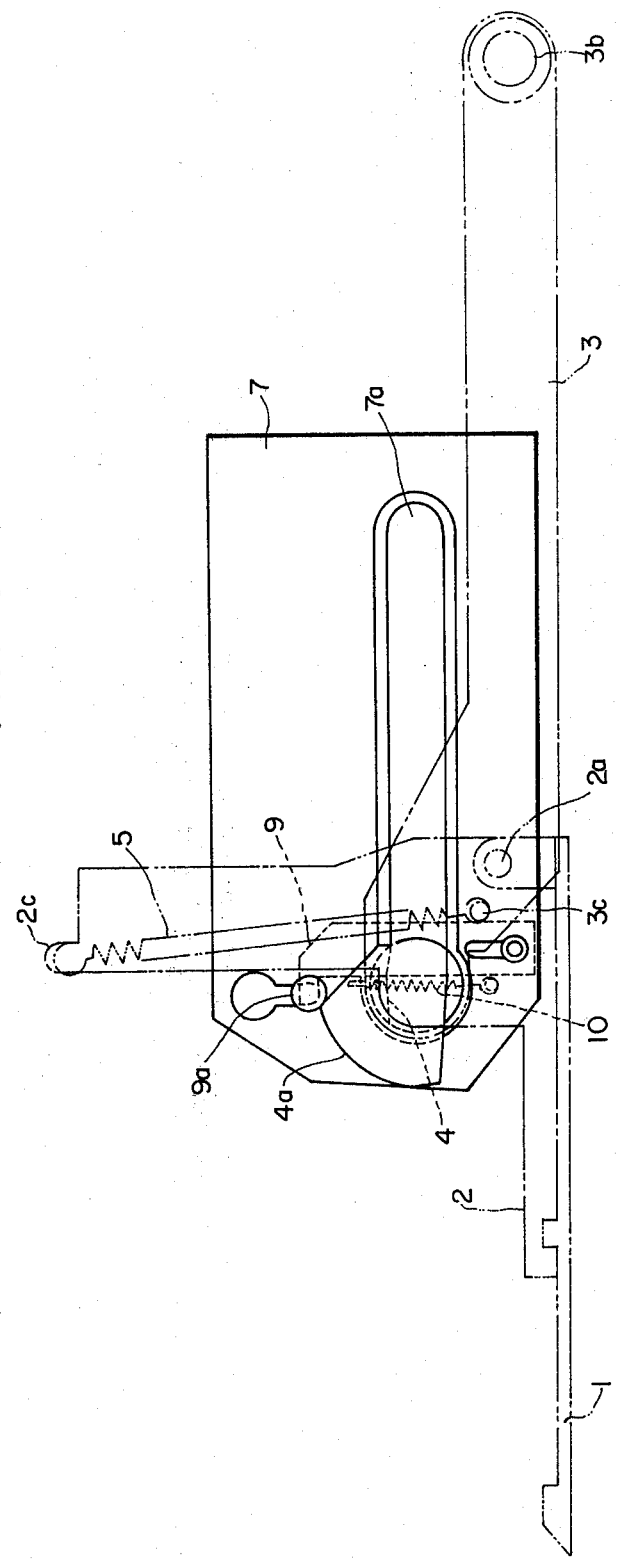

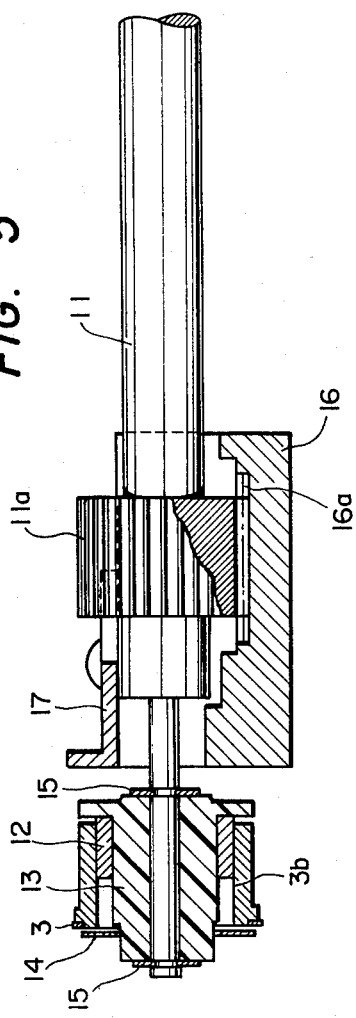
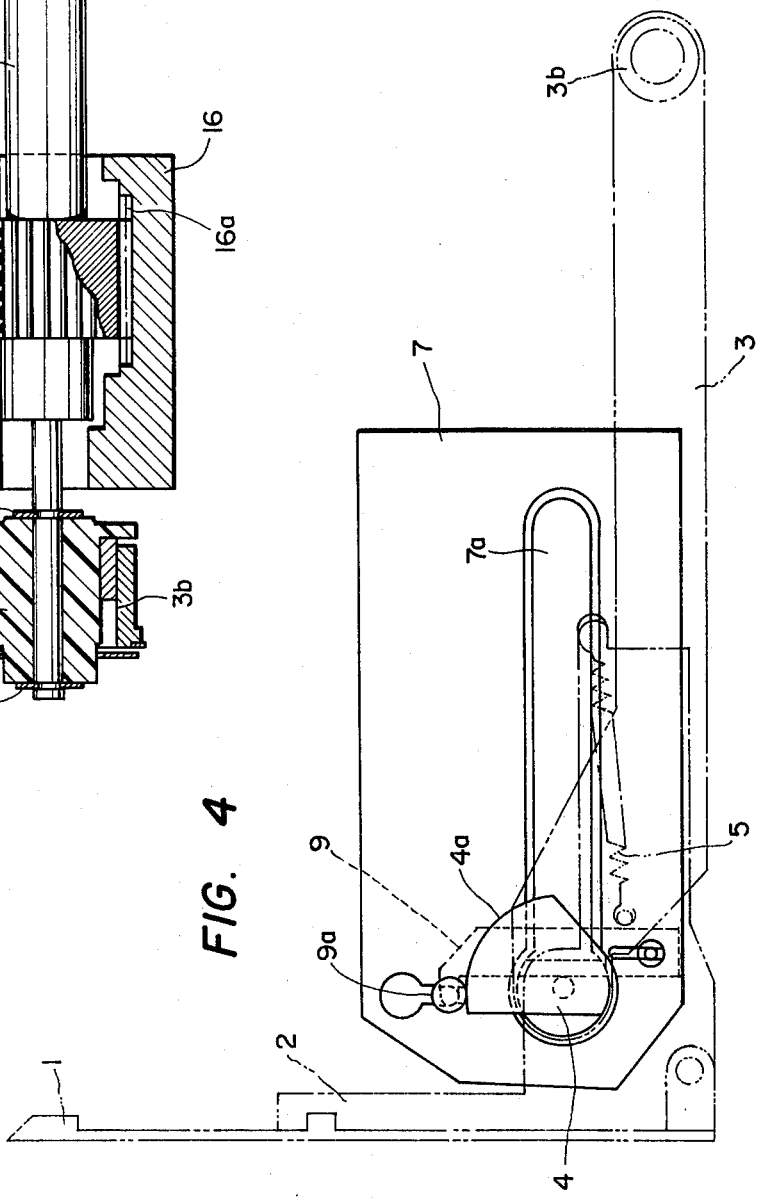

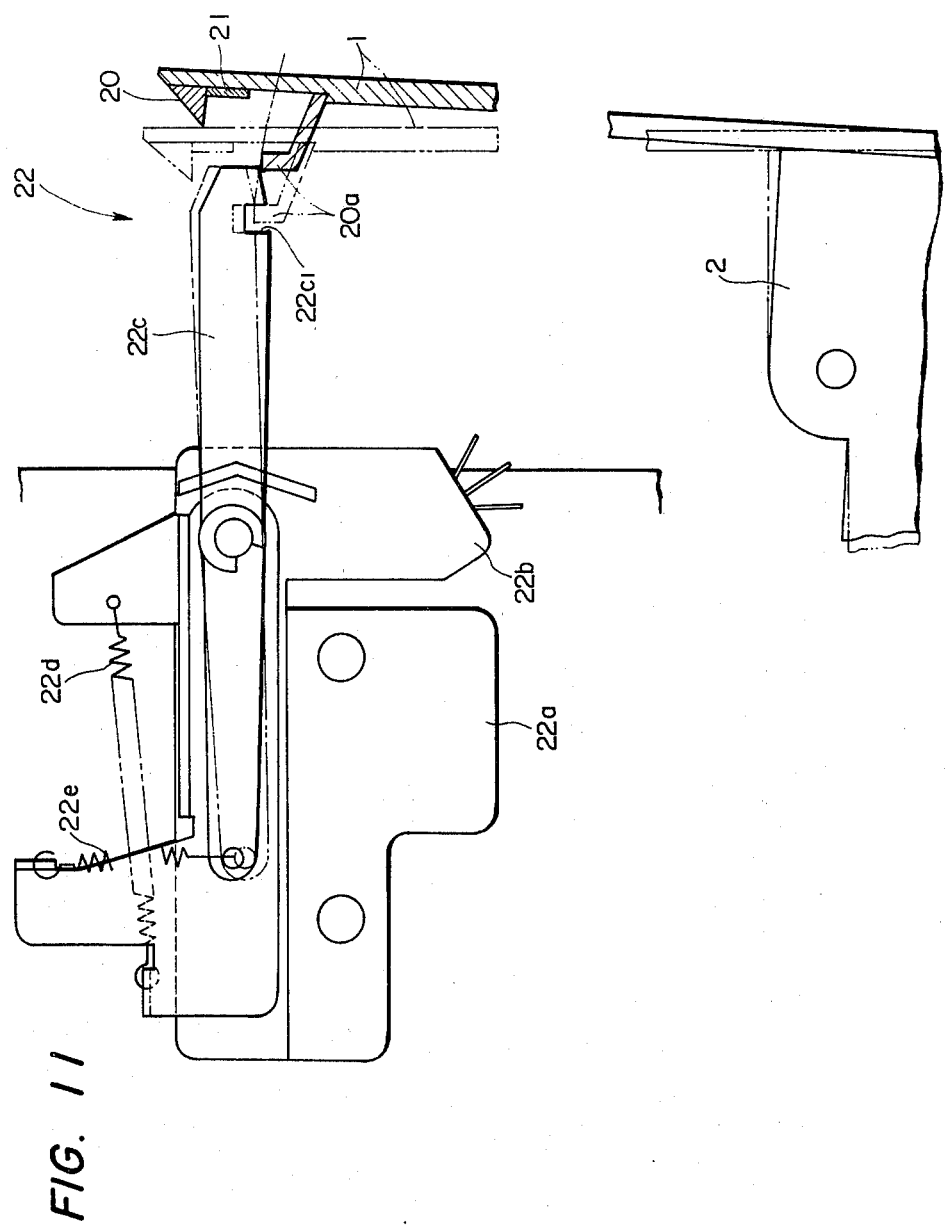

DOOR CONSTRUCTION FOR ELECTRONIC EQUIPMENT

BACKGROUND OF THE INVENTION

The present invention relates to a door construction for covering control knobs and the like mounted on front panels of electronic equipment specifically sound reproduction equipment such as a tape recorder, amplifier or tuner.

In such equipment, a door member for covering the front panels has been widely used in order to protect the front panel from air-born dust. The front panel is provided with control knobs which are not frequently used. In most prior art door constructions, the covering door is simply rotated by 90°. Therefore, as the door was opened the door itself tended to obstruct access to the control knobs. This defect becomes more remarkable as the size of the door is increased.

SUMMARY OF THE INVENTION

In order to overcome such disadvantages, the invention provides a door construction such as may be used for covering control knobs upon the front panel of electronic equipments such as a tape recorder or amplifier including a door member, means for forming a pair of guide grooves one on each side of the door member with each of the guide grooves having a linear guide groove and an enlarged circular guide groove at the front of the linear groove, first and second hinge members attached to the door member on opposite sides thereof, first and second guide rollers rotatably mounted upon corresponding ones of the first and second hinge members with each of the guide rollers having a substantially oblong portion and a coaxial cylindrical portion wherein the door is movable only horizontally when the oblong portions are engaged with the linear grooves and being only rotatable when the circular portions are engaged with the enlarged circular grooves. First and second auxiliary guide pins are mounted upon corresponding hinge members and means for forming auxiliary guide grooves parallel to the linear guide grooves are provided with the auxiliary guide pins being engaged in the auxiliary guide grooves when the door is horizontally movable and with the guide pins being disengaged from the auxiliary guide grooves when the door is in its rotatable position.

First and second connecting plates are provided each having one end rotatably supported about the point on the first and second hinge members upon which the guide rollers are rotatably mounted and with a gear shaft rotatably mounted between second ends of the connecting plates. The gear shaft has first and second gear members rigidly fixed thereto engaged with rack teeth formed in corresponding first and second rack plates. The gears are engaged with the rack plates for all positions of the door member. First and second springs are preferably provided having first ends thereof coupled to the first and second hinge members and with second ends connected to the connecting plates. The springs urge the door member to the closed position. First and second frictional plates are provided in sliding contact with the first and second springs.

Preferably, the door member is provided with a hooked portion on at least one side thereof. A locking mechanism is provided having longitudinally slidable locking arms which have a portion for engaging with the hooked portion on the door member. The locking arms are in a locked position at the closed position of the door. Damping means may be coupled to the gear shaft for damping rotational movement thereof.

Yet further, one of the guide rollers may be provided with a click plate having a cylindrical portion and a linear slanted surface portion contiguous therewith and with a spring-biased plate having a click roller positioned to abut the click plate. A stop member may be positioned to abut a gear shaft in the closed position of the door. A switch is preferably provided at a position so as to be movable between on and off positions by a projection extending from one of the locking arms. The switch is operatively coupled to illumination lamps which are illuminated when the door is opened and extinguished when the door is closed.

BRIEF DESCRIPTION OF THE DRAWINGS

FIG. 3 is a side view of a guide portion of the door construction of FIG. 1 when the door is opened showing details of a guide roller and the guide structure used therein.

FIG. 4 is a side view of the guide portion when the door is closed.

FIG. 5 is a cross-sectional view of a guide shaft and associated structure.

FIG. 11 is a side view illustrating movement of the operating members shown in FIG. 9.

DESCRIPTION OF THE PREFERRED EMBODIMENTS

A preferred embodiment of a cassette tape recorder constructed according to the present invention will be hereinafter described with reference to the accompanying drawings.

Reference letter A designates a body of a tape recorder with all functional parts assembled and which includes a cassette tape receiving portion $A_1$, a front panel $A_3$ having a recess portion $A_4$ and a control knob portion $A_2$ which includes control knobs not frequently used. Reference letter B designates a cover for covering the body A and which is designed to be fastened to a chassis C by screws. A door 1 of the chassis is adapted to be opened, retracted or closed covering the recess portion $A_4$ of the front panel $A_3$. The chassis C also serves as a bottom cover for the body A.

Figure 1:
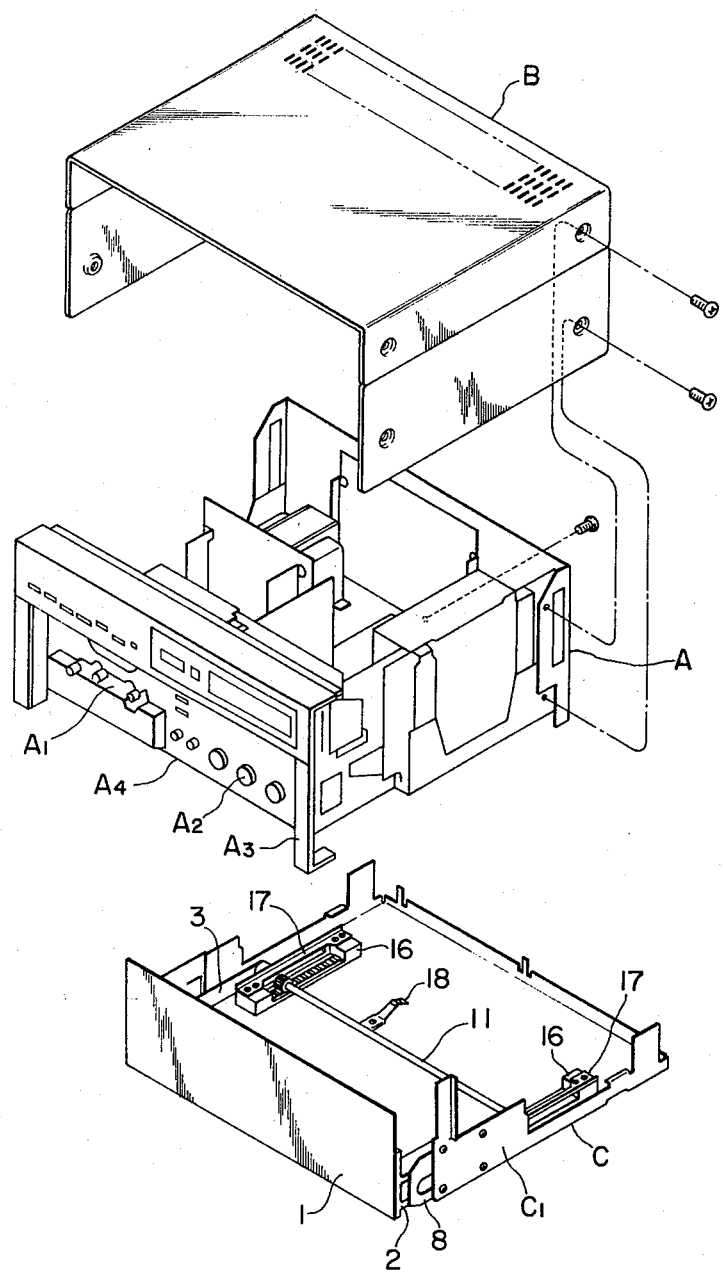
FIG. 1 is a perspective view showing a preferred embodiment of a door construction according to the present invention.
Figure 2:
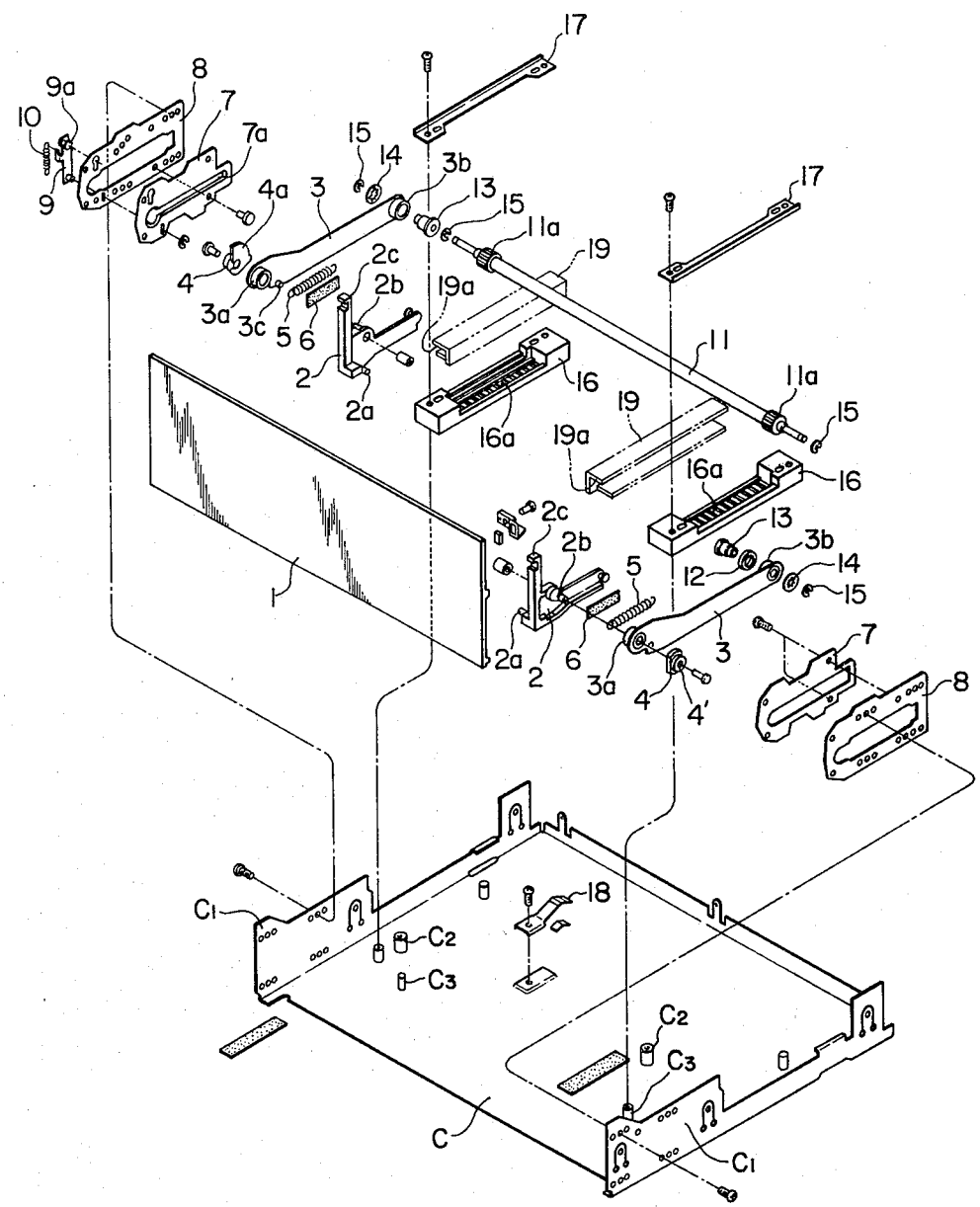
FIG. 2 is an exploded perspective view showing a portion of the door shown in FIG. 1.

The construction of the door 1 will now be described in greater detail. Referring now to FIG. 2 showing an exploded view of the chassis, the door 1 has substantially the same configuration as the recess portion $A_4$ of the front panel $A_3$. L-shaped hinges 2 are mounted on the lower portions of the door 1 on either side thereof.

Each of guide pins 2a extends from an inner corner lower portion of each hinge 2 and each of projecting shafts 2b extends from an outer corner upper portion of each hinge 2. Each of connecting plates 3 is provided at a front end with a bearing 3a into which the projecting shaft 2b is inserted and is provided at a rear end with a bearing 3b into which a gear shaft 11 is inserted. One of guide rollers 4 is mounted at the tip end of each projecting shaft 2b. The guide rollers 4 have a substantially oblong shape as viewed from the side. Its side projection 4' is cylindrical projecting upwardly. In other words, the upper and lower quarters of each guide roller 4 are semi-circular or arcuate and both side quarters thereof are straight and have a narrow width. Interposed between a front upper engagement pin 2c of each hinge 2 and an engagement pin 3c of each connecting plate 3 is a tension spring 5 in sliding contact with a frictional plate 6 made of felt or the like and which is attached to the side portion of the corresponding hinge 2. Only the left-hand guide roller 4 as viewed in FIG. 2 is integrally provided with a fan-shaped click plate 4a. The left-hand guide roller is guided by the guide plate 7 in which a guide groove 7a composed of a linear groove and a circular groove is formed. The width of the linear guide groove corresponds to a diameter of a cylindrical portion 4' of the guide roller 4 and the minimum width of the guide roller 4 so that the cylindrical portion 4' and the minimum width portion of the guide roller 4 are insertable into the linear groove of the guide groove 7a. The circular groove of the guide plate 7 is formed so that the cylindrical portion of the guide roller 4, which has a greater diameter than the cylindrical portion 4', can fit within the enlarged circular groove of the guide plate 7. Each of receiving plates 8 for the guide plates 7 is rigidly attached to an upright wall $C_1$ of the chassis C as is consequently the guide plate 7. A slidable plate 9 is mounted on the receiving plate 8 movably up and down and is provided at an upper end with a click roller 9a which is to abut against the above-described click plate 4a. The click roller 9a is normally biased toward the click plate 4a by a spring 10 so that when the door 1 is opened the click roller 9a will abut against a linear slanted surface of the click plate 4a (FIG. 3) whereas when the door 1 is upright the click roller 9a abuts against a circular surface of the click plate 4a (FIG. 4).

Figure 6:
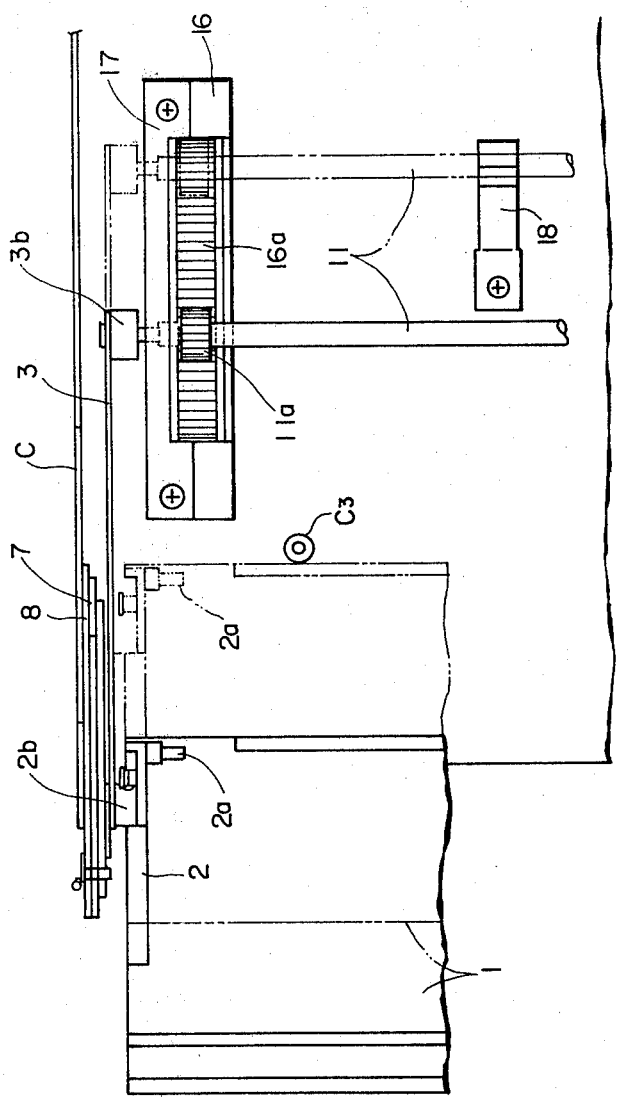
FIG. 6 is a plan view showing the guide portion and a gear shaft portion.
Figure 7:
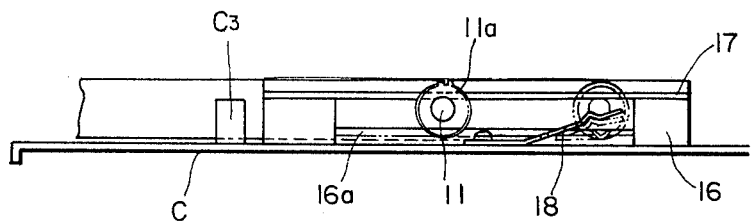
FIG. 7 is a side view showing the gear shaft portion.
Figure 8:
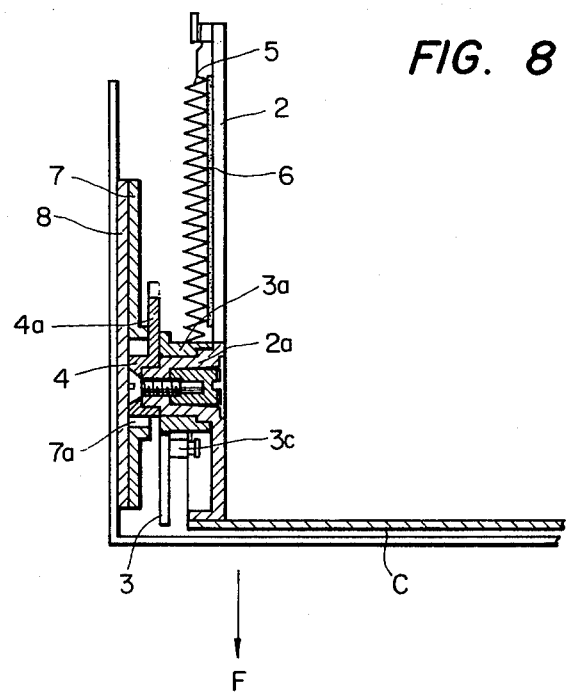
FIG. 8 is a cross-sectional view showing the guide portion.

A gear shaft 11 is supported by the bearings 3b of the connecting plates 3 and is rigidly provided at end portions with gears 11a. As shown in FIG. 5, the respective end portions of the gear shaft 11 are rotatably inserted into shaft receivers 13 made of synthetic resin such as a polyacetal and with the shaft receivers 13 being rigidly inserted into the bearings 3b through damper elements 12. A stopper ring 14 prevents the shaft receiver 13 from being withdrawn from the bearing 13. A pair of washers 15 cooperate to prevent the shaft receiver 13 from being withdrawn from the gear shaft 11. Each of rack plates 16 has a number of gear teeth 16a engaged with the gear 11a as best shown in FIGS. 6 and 7. Each of push plates 17 disposed above the rack plate 16 prevents the gear shaft 11 from disengaging from the rack plate 16. A resilient stopper piece 18 fixed to the chassis C engages, when the door 1 is closed, with a middle portion of the gear shaft 11 as a result of which the user can sense the final stage of the door closing.

Each of auxiliary guide plates 19, which are coupled to the undersurface of the body A, has a U-shaped cross section. An abutting portion 19a of each auxiliary guide plate 19 extends to a position in abutment with the guide pin 2a of the corresponding hinge 2 when the door 1 is fully opened. When the door 1 is closed, the guide pins 2a are guided along the auxiliary guide plates 19.

Figure 9:
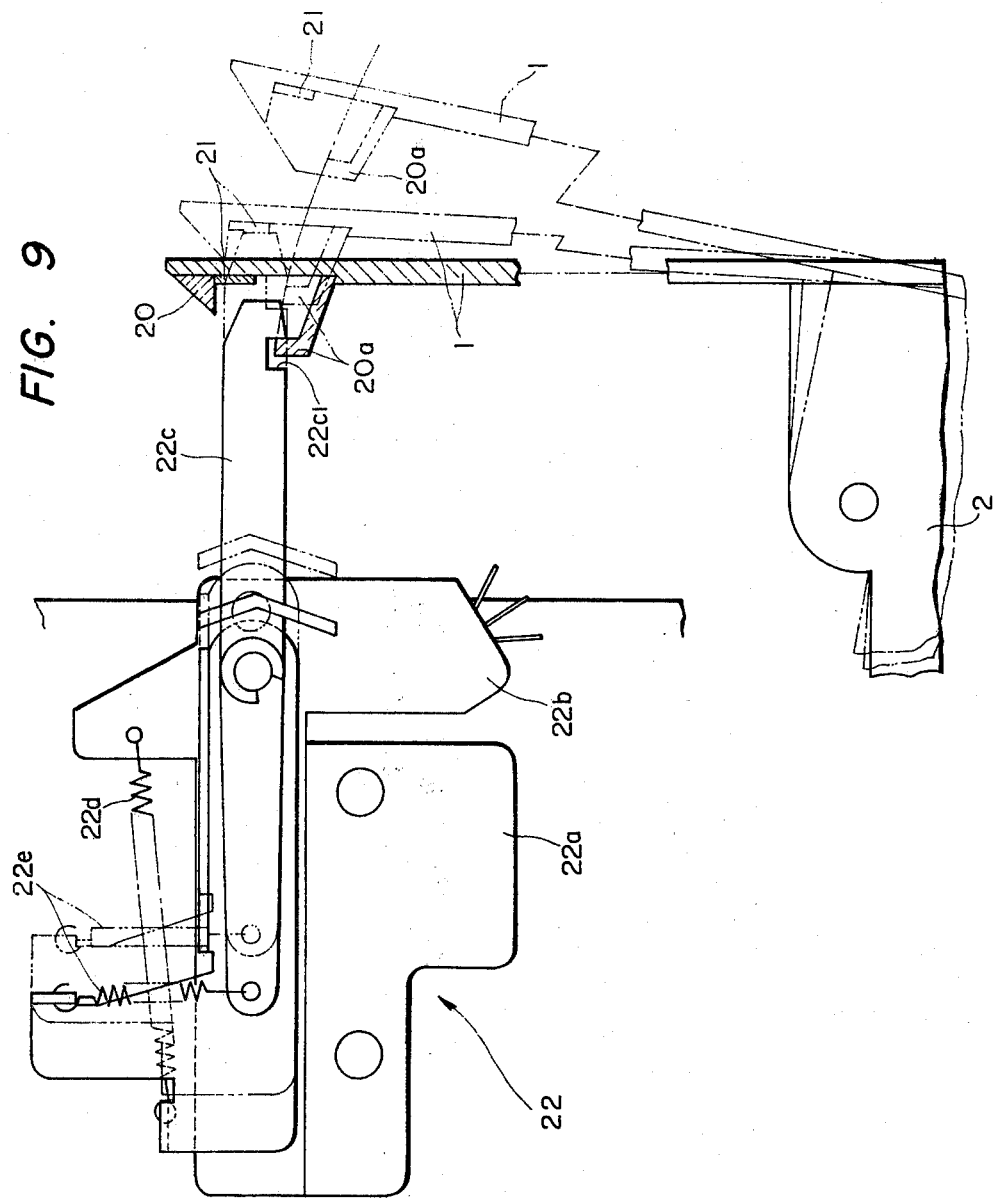
FIG. 9 is a side view showing a door locking mechanism.

As shown in FIG. 9 locking member 20 fixed to the door 1 is provided with an angled portion 20a and a damper element 21 such as a sponge is attached to the door 1. A locking mechanism generally designated by 22 is attached to the body A through a mounting plate 22a. A slide plate 22b is slidably mounted on the mounting plate 22a to be movable forwardly and rearwardly. A locking arm 22c is pivotably supported at a mid portion thereof by the slide plate 22b. Disposed between the mounting plate 22a and the slide plate 22b is a spring 22d which biases the slide plate to normally move forwardly. Also disposed between the slide plate 22b and the locking arm 22c is a spring 22e for normally holding the locking arm 22c with its front end disposed horizontally. At the front end of the locking arm 22c is formed an engagement portion $22c_1$ for engaging with the L-shaped portion 20a of the locking member 20.

Figure 10:
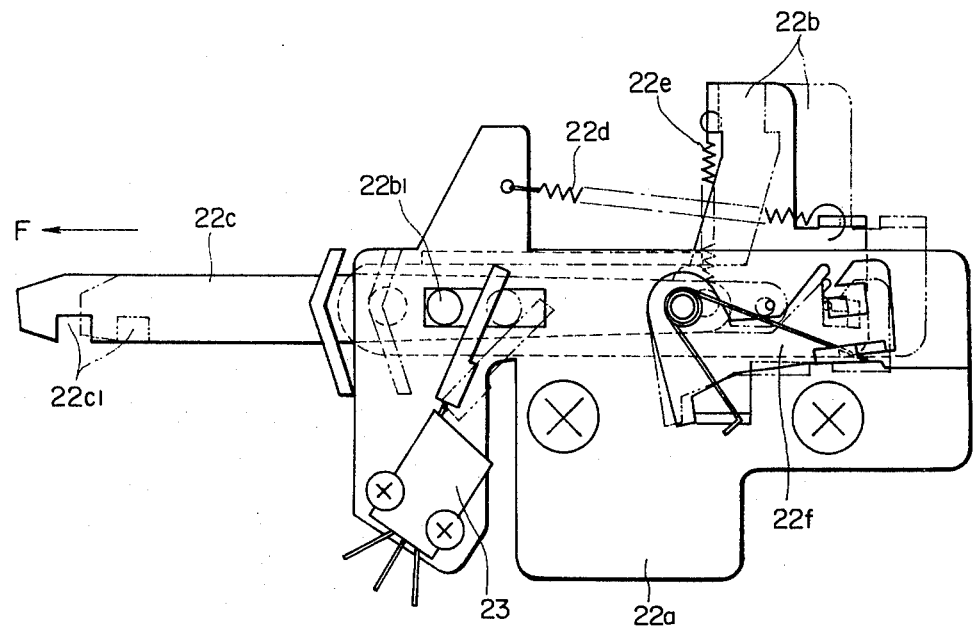
FIG. 10 is a side view showing the door locking mechanism as viewed from the interior.

A ratchet plate 22f is mounted on the mounting plate 22a as shown in FIG. 10 at a position so that as the locking arm 22c is first moved rearwardly, the locking arm 22c is interlocked in the closed state and as the locking arm 22c is moved rearwardly again, the locking arm 22c is advanced forwardly in the F direction indicated in FIG. 10. The mechanism of the ratchet plate 22f is well known in the art and therefor, a further explanation is omitted. A micro-switch 23 is mounted on the above-described mounting plate 22a. When the slide plate 22b is at a forward position, the switch is ON whereby illumination lamps such as for a window of the cassette tape, a tape remainder indicator, control knobs and the like are lit. Desirably, illumination lamps arranged in front of or behind the recess portion $A_4$ of the front panel $A_3$ are lit.

With regard to assembly of the door structure, after the front panel $A_3$ has been mounted on the body A, the chassis C is mounted thereon utilizing posts $C_2$ which have been previously mounted on the chassis. Then, the cover B is mounted after which the panel $A_3$ may be mounted on the body A after the chassis C is mounted.

The operation of the door 1 will now be explained. Reference will be made to only one side of the door structure because both side assemblies are operated simultaneously in substantially the same way. As shown in FIG. 3, the door 1 is opened. The door 1 may be moved to the closed position from this state since the longitudinal axis of the oblong guide roller 4 is horizontally disposed so that it can be moved along the guide groove 7a of the guide plate 7. In the state shown in FIG. 3, the guide pin 2a of the hinge 2 is in abutment with the abutting piece 19a of the auxiliary guide plate 19 so that the door 1 is maintained in a horizontal position. When the door 1 in this state is rotated towards the closed position, the guide roller 4 is guided by the guide plate 7 while the guide pin 2a is guided by the auxiliary guide plate 19 moving horizontally. At the commencement of the closing movement, the click roller 9a is pushed upward against the force of the spring 10 by the click plate 4a of the guide roller 4 whereby click-stop locking of the door is released.

The two side roller mechanisms operate as follows. If a force is applied locally to one side of the door 1 in such a direction as to depress the door 1, the connecting plate 3 to which the force is applied locally tends to move before the other connecting plate 3. However, since both connecting plates 3 are connected through the common gear shaft 11 and moreover the gear wheels 11a coupled to the ends of the gear shaft 11 are engaged with the rack teeth 16a of the racks 16, the two connecting plates 3 will move at the same speed regardless of the position where the force is applied. Accordingly, the door 1 can be opened smoothly.

Rotational fluctuations may be generated during the movement of the gear wheels 11a. However, since the connecting plates 3 are connected through the damper elements 12 to the gear shaft 11 as shown in FIG. 5, any such fluctuations are absorbed by the damper elements 12 and hence are not transferred to the connecting plates 3. Accordingly, the user cannot feel any fluctuations.

In the closed position, door 1 abuts against damper stoppers $C_3$ extending from the bottom surface of the chassis C. Also in the closed position, the gear shaft 11 is resiliently engaged with the stop member 18 to thereby prevent the accidental opening of the door 1. The click pressure which is generated when the gear shaft 11 resiliently hits the stop member 18 is transmitted to the user's hand to thereby indicate the stop position has been reached. This position is illustrated in FIGS. 6 and 7.

The connecting plates 3 serve as bearings for the rotational and sliding sections of the guide roller mechanisms and for the rack and pinion mechanisms in which the gear portions can be used only for linear movement and can be separated from the rotational movement of the hinge portion to thereby always maintain the gears in engagement. Accordingly, it is not required to engage or disengage the gear portions. If the alternative engagement and disengagement were required, the gears would often not be well engaged. It should be noted that the rack portions may be positioned rearwardly to thereby increase the amount of space available when the door is closed.

The operation with which the door 1 is opened will be described. When opening the door 1, the door 1 is advanced forwardly with the gear shaft 11 disengaged from the stop member 18. Then, the click roller 9a comes into contact with the circular portion 4a of the click plate 4a riding upon the circular portion until it contacts the linear slant portion. The click pressure generated when the click roller 9a rides upon the click plate 4a is transmitted to the user's hand to thereby indicate the stop position and the door is locked in the open position at this point. At this position, the guide roller 4 is positioned at the circular groove of the guide groove 7a of the guide plate 7 and the guide pin 2a is outside of the guide groove of the auxiliary guide plate. Therefore, the door 1 is at a position at which the door rotation is possible.

When the upper edge of the door 1 is lifted, the door 1 is rotated about the guide roller 4. Even if the door 1 is released midway of the rotational movement, the door 1 will not drop under the force of gravity because of the force provided by the spring 5. Accordingly, the door 1 is stopped at any position where the user's band separates from the door.

Figure 12:
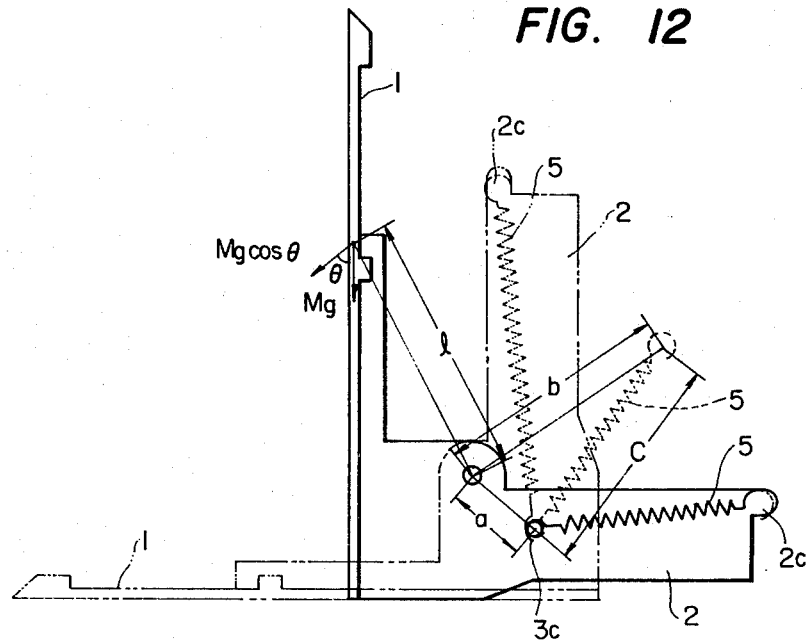
FIG. 12 is a diagram illustrating forces upon various operating members.

The effect of the spring 5 will be described in greater detail with reference to FIG. 12. The following equations relates to the situation designated in FIG. 12:

$$l \cdot Mg \cos\psi_1 = b \cdot 2W \sin\theta$$
$$= b \cdot 2\{k(C - L) + W_0\}\sin\theta;$$

-continued $$\text{where, } C \approx \sqrt{a^2 + b^2} \text{ ; and, } \sin\theta = \frac{a \cos\psi_2}{\sqrt{a^2 + b^2}}.$$

$$\text{That is, } Mg \cos\psi_1 \approx 2a\, b\, k \left(1 - \frac{L + W_0/k}{\sqrt{a^2 + b^2}}\right) \cos\psi_2,$$

where l is the distance from the rotational center to the center of gravity of the door, Mg is the weight of the door, a is the distance from the rotational center to the corresponding engagement pin 3c, b is the distance between the rotational center and the corresponding engagement pin 2c, k is the spring constant, L is the length of the springs without a load, C is the length of each spring while mounted, W is the load on each spring, $W_O$ is the initial tension force of each spring, $\psi_1$ is the rotational angle of the door, $\psi_2$ is the angle of a line extending between the engagement pins 3c and 2c to the horizontal and $\theta$ is the angle of a line extending between the engagement pin 3c and the rotational center to the horizontal.

In order to absorb the variations in rotational moment due to the effects of the gravitational force on the door 1 by the spring action, the positions of the spring supports, that is, the distances a and b and the angle $\psi_2$, and further, the spring constant k and the initial spring force must be selected to satisfy the above-noted equation. Further, in order to absorb the variations in spring force, frictional plates 6 are provided in contact with the springs 5.

The locking mechanism for the door operates as follows. When the door 1 is rotated in the closing direction as shown in FIG. 9, the frontward end of locking arm 22c engages with the locking member 20 abutting the damping element 21. When the door is further rotated, the locking arm 22 is pushed rearwardly and the L-shaped portion of the locking member 20 engages with the engagement portion $22c_1$ of the locking arm 22c. That is, since the locus of the upper end of the L-shaped portion 22a coincides with the position of the engagement portion $22c_1$, the engagement portion $22c_1$ is introduced into the interior of the L-shaped portion 20a as the door is rotated. When the door 1 is in the upright condition, the ratchet plate 22f and the slide plate 22b engage with each other and are thereby locked. Therefore, the door 1 is locked in a state in which the recess portion $A_4$ of the front panel $A_3$ is covered by the door 1. At the same time, the micro-switch 23 is turned off since the projection of the micro switch 23 is pushed by a projection $22b_1$ of the slide plate 22b. Accordingly, in this position, all the illumination lamps are turned off.

In order to disengage the door lock, the upper end of the door 1 is pushed rearwardly so that the locking arm 22c is further retracted to thereby release the engagement between the slide plate 22b and the ratchet plate 22f and the locking arm 22c is advanced by the force of the spring 22d. During the forward movement, the locking arm 22c and the locking member 20 are disengaged from each other due to the relation of the loci of the engagement $22c_1$ and the L-shaped portion 20a. As the door 1 is rotated downwardly, the guide pin 2a comes into contact with the abutting piece 19a of the auxiliary guide plate 19 when the guide roller 4 coincides with the enlarged circular groove portion of the guide groove 7a in the guide plate 7. When the lock is released, the micro-switch 23 is closed to turn on the illumination lamps.

When the door is locked, if the locking arm 22c is pushed accidentally while the slide plate 22b and the ratchet plate 22f are engaged with each other, the L-shaped portion 20a of the locking member 20, as shown in FIG. 11, pushes the end of the locking arm 22c upwardly against the force of the spring 22e. Accordingly, when the door 1 is pushed in the closing direction, the engagement portion 22$c_1$ is introduced into the L-shaped portion 20a and subsequently the end of the locking arm 22c is pulled downward by the force of the spring 22e to engage the locking arm 22c with the locking member 20.

The lock release operation is simply an operation opposite to that described above. Accordingly, a detailed explanation thereof will be dispensed with.

What is claimed is:

1. A door construction for covering control knobs upon the front panel of electronic equipment comprising: a door member; means for forming a pair of guide grooves one on each side of said door member, each of said guide grooves having a linear guide groove extending longitudinally and an enlarged circular guide groove at a forward portion of said linear grooves; first and second hinge members attached to said door member on opposite sides thereof; first and second guide rollers rotatably mounted upon corresponding ones of said first and second hinge members, each of said guide rollers having a substantially oblong portion and a coaxial cylindrical portion, said door being movable only horizontally when said oblong portions are engaged with said linear grooves and said door being only rotatable when said circular portions are engaged with said enlarged circular grooves.

2. The door construction of claim 1 further comprising first and second auxiliary guide pins mounted, respectively, upon said first and second hinge members and means for forming auxiliary guide grooves parallel to said linear guide grooves, said auxiliary guide pins being engaged in said auxiliary guide grooves when said door is horizontally movable and said guide pins being disengaged from said auxiliary guide grooves when said door is rotatable.

3. The door construction of claim 2 further comprising first and second connecting plates having one end rotatably supported about the point on said first and second hinge members upon which said guide rollers are mounted and a gear shaft rotatably mounted between second ends of said connecting plates, said gear shaft having first and second gear members fixedly engaged therewith, and first and second rack plates having rack teeth engaged, respectively, with said first and second gears, said gears being engaged with said rack plates for all positions of said door member.

4. The door construction of claim 3 further comprising first and second springs coupled, respectively, at first ends thereof to said first and second hinge members and being coupled, respectively, to said first and second connecting plates at second ends thereof, said first and second springs uring said door member to a closed position, and first and second frictional plates in sliding contact, respectively, with said first and second springs.

5. The door construction of claim 3 wherein said door member is provided with a hooked portion on at least one side thereof and further comprising a locking mechanism having longitudinally slidable locking arms, said locking arms each having a portion for engaging with said hooked portion, said locking arms being in a locked position at the closed position of said door.

6. The door construction of claim 3 further comprising damping means coupled to said gear shaft for damping rotational movement thereof.

7. The door construction of claim 3 wherein one of said guide rollers is provided with a click plate, said click plate having a cylindrical portion and a linear slanted surface portion and further comprising a spring-biased plate having a click roller positioned to abut said click plate.

8. The door construction of claim 3 further comprising a stop member positioned to abut said gear shaft in a closed position of said door.

9. The door construction of claim 5 further comprising switch means disposed at a position to be moved between on and off positions by a projection extending from one of said locking arms, said switch means being operatively coupled to illumination lamp means wherein said lamp means are illuminated when said door is opened and extinguished when said door is closed.

* * * * *